United States Patent
Oh et al.

(10) Patent No.: US 6,340,728 B1
(45) Date of Patent: Jan. 22, 2002

(54) METHOD FOR OLEFIN POLYMERIZATION WITH RECYCLING OF CO-CATALYST

(75) Inventors: Jae-Seung Oh; Bun-Yeoul Lee, both of Taejon; Yoon-Hyeun Oum, Seoul; Tai-Ho Park, Yeosoo, all of (KR)

(73) Assignee: LC Chemical Ltd. (KR)

( * ) Notice: Subject to any disclaimer, the term of this patent is extended or adjusted under 35 U.S.C. 154(b) by 0 days.

(21) Appl. No.: 09/494,711

(22) Filed: Jan. 31, 2000

(30) Foreign Application Priority Data

Jan. 30, 1999 (KR) ............................................. 99-3027
Dec. 27, 1999 (KR) ............................................. 99-62906

(51) Int. Cl.$^7$ ................................................. C08F 2/14
(52) U.S. Cl. ........................... 526/70; 526/67; 526/69; 526/129; 526/160
(58) Field of Search .................. 526/67, 69, 70, 526/129, 160, 901, 943

(56) References Cited

FOREIGN PATENT DOCUMENTS

WO    WO 99/52952    * 10/1999

OTHER PUBLICATIONS

"Halogen–Free Soluble Ziegler Catalysts for the Polymerization of Ethylene. Control of Molecular Weight by Choice of Temperature", Angew. Chem. Int. Ed. Engl. vol. 15 (1976) No. 10, pp. 630–632.

"New Pd(II)–and Ni(II)–Based Catalysts for Polymerization of Ethylene and α–Olefins", J. Am. Chem. Soc. (1995) 117, pp. 6414–6415.

"Copolymerization of Ethylene and Propylene with Functionalized Vinyl Monomers by Palladium(II) Catalysts", J. Am. Chem. Soc. (1996) 118, pp. 267–268.

"Polymerization of α–Olefins by Chelating Diamide Complexes of Titanium", Macromolecules (1996) 29, pp. 5241–5243.

"Highly Active Iron and Cobalt Catalysts for the Polymerization of Ethylene", J. Am. Chem. Soc. (1998) 120, pp. 4049–4050.

"Neutral Nickel(II)–Based Catalysts for Ethylene Polymerization", Organometallics (1998) 17, pp. 3149–3151.

* cited by examiner

Primary Examiner—David W. Wu
Assistant Examiner—William K Cheung

(57) ABSTRACT

Disclosed are catalyst preparation olefin polymerization processes with the recycling of a co-catalyst. According to the olefin polymerization process activated single-site catalysts are prepared by contacting supported single-site pre-catalyst with an organic solvent containing co-catalyst. The activated single-site catalysts are separated from co-catalysts dissolved in an organic solvent and the olefin polymerization is conducted using the separated single-site catalysts with one or more olefinic monomers. The separated co-catalysts is reused by recycling the organic solvent containing the separated co-catalysts and contacting them with the supported single-site pre-catalysts. The olefin polymerization process of the present invention enables recycling expensive co-catalyst for subsequent olefin polymerization and accordingly the total amount of co-catalyst required can be significantly reduced.

13 Claims, 1 Drawing Sheet

METHOD FOR OLEFIN POLYMERIZATION WITH RECYCLING OF CO-CATALYST

CROSS REFERENCE TO RELATED APPLICATION

This application is based on application Nos. 99-3027 and 99-62906 filed in the Korean Industrial Property Office on Jan. 30, 1999 and Dec. 27, 1999, respectively, the content of which are incorporated here into by reference.

BACKGROUND OF THE INVENTION (a) Field of the Invention

The present invention relates to an olefin polymerization process with the recycling of co-catalyst, particularly to a method of recycling co-catalyst for the activation of single-site pre-catalyst in the olefin polymerization. This invention, therefore, provides an olefin polymerization process that can reuse expensive co-catalyst for subsequent olefin polymerization so that the total amount of co-catalyst required can be significantly reduced.

(b) Description of the Related Art

In 1976, Professor Kaminsky of Germany reported that olefin polymerization could be accomplished by using zirconocendichloride compound as a catalyst with a methylaluminoxane (MAO) co-catalyst which was obtained through a partial hydrolysis of trimethylaluminum (A. Anderson, J. G. Corde. J. Herwing, W. Kaminsky, A. Merck, R. Mottweiler, J. Pein, H. Sinn, and H. J. Vollmer, Angew. Chem, Int. Ed. Engl. 15, 630 (1976)). MAO is conventionally called an aluminoxane because it is prepared by mixing trimethylaluminum with other alkyl aluminum. This single-site catalyst shows unique polymerization characteristics that can not be embodied by the conventional Ziegler-Natta catalysts. That is, molecular weight distribution of the produced polymer is narrow, co-polymerization is easy, and the co-monomer distribution is uniform. Furthermore, changes in catalyst ligands lead to variations in the molecular weight and degree of co-polymerization. Additionally, the stereo-selectivity in the polymers can be changed according to the molecular symmetry of the catalysts. Therefore, a lot of attention has been drawn to the single-site catalysts due to these advantageous characteristics.

Compared to the Ziegler-Natta catalysts that have several independent active sites, the single-site catalysts have only one type of active site and are composed of various transition metals with suitable ligands. As described in detail below, transition metal metallocene compounds with one or two cyclopentadienyl ligands are the most representative examples, but non-metallocene type transition metal compounds with diimine ligands have also been studied recently (L. K. Johnson, C. K. Killian, M. Brookhart, *J. Am. Chem. Soc.*, 117, 6414 (1995); L. K. Johnson, S. Mecking, M. Brookhart, *J. Am. Chem. Soc.*, 118, 267 (1996); J. D. Scollard, D. H. McConville, N. C. Payne, J. J. Vittal, *Macromol.*, 29, 5241 (1996); B. L. Small, M, Brookhart, A. M. A. Bennett, *J. Am. Chem. Soc.*, 120, 4049 (1998); C. Wang, S. Friedrich, T. R. Younkin, R. T. Li, R. H. Grubbs. D. A. Bensleben, M. W. Day, *Organometallics*, 17, 3149 (1998)).

The metallocene type compounds of the above single-site pre-catalyst are described by the following General Formulae 1 or 2.

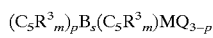  [General Formula 1]

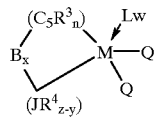  [General Formula 2]

In the above General Formulae 1 and 2, M is a transition metal of Group 4, 5 (IVA, VA in the previous IUPAC form), or lanthanide series; $(C_5R^3_m)$ and $(C_5R^3_n)$ are a cyclopentadienyl, a substituted cyclopentadienyl ligand, or a substituted cyclopentadienyl ligand in which two adjacent carbon atoms of a $C_5$ are joined together to form one or more $C_4$–$C_{16}$ rings by a hydrocarbyl radical, in which each $R^3$, which can be the same as or different from other $R^3$, is a hydrogen radical, or an alkyl, cycloalkyl, aryl, alkenyl, alkylaryl, arylalkyl, or arylalkenyl radical having from 1 to 20 carbon atoms, or a metalloid of Group 14 (IVB in the previous IUPAC form) substituted by hydrocarbyl radicals;

B is an alkylene carbon chain, alkenylene carbon chain having from 1 to 4 carbon atoms, arylene carbon chain, dialkyl germanium, dialkyl silicon, alkyl phosphine, or alkyl amine radical substituting on and bridging two cyclopentadienyl ligands, or a cyclopentadienyl ligand and $JR^4_{z-y}$ ligands by a covalent bond;

$R^4$ is a hydrogen radical, or an alkyl, aryl, alkenyl, alkylaryl, or arylalkyl radical having from 1 to 20 carbon atoms;

J is an element of Group 15 (VB in the previous IUPAC form) or Group 16 (VIB in the previous IUPAC form);

each Q, which can be the same as or different from other Q, is a halogen radical, an alkyl, alkenyl, aryl, alkylaryl, or arylalkyl radical having from 1 to 20 carbon atoms, or an alkylidene radical having from 1 to 20 carbon atoms;

L is a Lewis base;

s is 0 or 1 and p is 0, 1 or 2 provided that when p is 0, then s is 0, when s is 1, then m is 4, and when s is 0, then m is 5;

z is a valence number of J provided that when J is an element of Group 15 (VB in the previous IUPAC form), then z is 3, and when J is an element of Group 16 (VIB in the previous IUPAC form), then z is 2;

x is 0 or 1 provided that when x is 0, then n is 5, y is 1, and w is greater than 0, and when x is 1, then n is 4, y is 2, and w is 0);

However, the single-site pre-catalyst itself described above does not have polymerizing activity. To activate this pre-catalyst, excess aluminoxane co-catalyst is required. In the polymerization process utilizing the single-site catalysts and co-catalysts, it takes hundreds to tens of thousands of moles of aluminum co-catalyst per each mole of single-site compounds in order to achieve commercially desired level of catalyst activity.

Excess aluminoxane remains in the polymer and deteriorates the physical properties of the resins. Furthermore, it obstructs the commercial applications of the catalyst system due to the increased price of the catalyst resulting from the high aluminoxane cost.

The polyolefin process can also be divided into solution, bulk, high pressure, slurry, and gas phase processes. Substituting conventional Ziegler-Natta catalysts with single-site catalysts has been applied to existing processes due to economic reasons. The greatest difficulty in the application of the single-site catalyst to the existing processes is the complete loss of the aluminoxane, which is not only costly but also used in large excess in each polymerization process.

Once a single-site catalyst and a co-catalyst are introduced in a polymerization reactor, the single-site catalyst and excess co-catalyst are discharged out of the polymerization reactor along with polymers and solutions (or monomers in a bulk process) at the end of a polymerization process resulting in a loss of catalyst activity. In other cases, in order to prevent problems in the post treatment process, various catalyst poisons are added to deactivate catalysts. Therefore, the single-site catalyst and co-catalyst are completely lost in each polymerization reaction. As described above, there are difficulties in commercializing single-site catalysts under existing technologies due to the high catalyst cost. Furthermore, the physical properties of resins deteriorate due to excessive quantities of aluminum residue in resins. Therefore, it would be preferable to develop single-site catalyst preparing technologies that not only decrease the amount of aluminoxane consumption, but also maintain effective activities in order for such single-site catalyst technologies to be commercialized at a lower cost.

The role of aluminoxane is to activate single-site pre-catalyst so that a cationic active species is formed, and to stabilize the corresponding cation as a counter anion. Furthermore, aluminoxane is also known to play a role as a scavenger, removing impurities during the polymerization. Therefore, the aluminoxane consumption can be greatly reduced if the excess aluminoxane is recycled except for that which is required to activate single-site pre-catalyst and to stabilize the active cationic species as a counter anion.

The inventors of this invention have also developed a related technology in which polymerization solution containing co-catalyst is recycled after separation of the produced polymer from the polymerization solution in a continuous slurry process (Korean Patent: 98-12659; PCT: PCT/KR99/00170). In this invention, polymerization is performed in a catalyst system in which metallocene catalyst is anchored on a support so that it does not go into solution and the co-catalyst is dissolved in a polymerization solution. After a polymerization reaction, the polymerization solution is separated from the polymers, and the co-catalyst dissolved in the solution is recycled in the continuous process so that the amount of co-catalyst is reduced. A diagram of the desired process is illustrated in FIG. 2 in order to provide a better understanding of the process.

However, the above technology, which necessitates separation of co-catalyst from the polymer after a polymerization, is applicable only to a slurry process and the polymerization media is limited to co-catalyst soluble solvents. Additionally, small amounts of leached catalyst from the support causes reactor fouling which disables the operation in a continuous process. Furthermore, the above technology still needs large amount of co-catalyst because the polymerization media is large excess to the catalyst and an optimum catalyst activity is achieved at a very high concentration ratio of co-catalyst to catalyst. In the above technology large amounts of co-catalyst are consumed by the reaction with impurities in the polymerization media and the co-catalyst physisorbed on polymers is also lost with the exposed polymers. Besides, a conventional olefin polymerization catalyst system employs a specific co-catalyst such as alkyl aluminum dissolved in a solvent, and the mixing or exchange of the co-catalyst is highly limited. Therefore, with the above technology, in order to switch to another catalyst/co-catalyst system, separation of the co-catalyst from the polymerization media or exchange of the whole polymerization media is necessary due to the restriction of the mixing or exchange of the catalyst or co-catalyst.

Considering the problems in the previous technology, development of new technology is necessary. It is desirable if the new technology is applicable to processes other than the slurry process and if it is also applicable regardless of the polymerization media. It is also desirable if reactor fouling can be prevented even in the event of the leaching of the supported catalyst, as well as if the amount of the co-catalyst can be reduced while the maximum ratio of the catalyst to co-catalyst for an optimal activity can be maintained. It is further desirable if the loss of the co-catalyst due to the impurities or during the polymerization process can be reduced and a low-cost common alkyl aluminum can be used as a scavenger substitute and the switching to a new process employing a new catalyst/co-catalyst system is convenient.

SUMMARY OF THE INVENTION

The purpose of this invention is to provide a method for an olefin polymerization with the recycling of co-catalyst such as aluminoxane, so that the amount of the co-catalyst for the activation of catalysts can be minimized and the loss of the co-catalyst by reactions with impurities or during the polymerization process can be greatly reduced. Furthermore, inexpensive common alkyl aluminum compounds can be used together with alumonoxane conveniently and the switching to another catalytic or co-catalytic system in the same process is easy using the same process. Additionally, the reactor fouling of the olefin polymerization process can be effectively prevented by recycling of co-catalyst during the activation step.

Another purpose of this invention is to provide a preparation method for an activated single-site catalyst which is applicable in a slurry or a gas phase process regardless of the polymerization media in the above olefin polymerization process. Particle size of the catalyst can be controlled by the changing the catalyst activation condition or the preliminary polymerization condition in this invention.

Still another purpose of the invention is to provide an olefin polymerization process using the activated catalyst prepared in the above method with the recycling of co-catalyst.

BRIEF DESCRIPTION OF THE DRAWINGS

Further objects and other advantages of the present invention will become apparent from the following description in conjunction with the attached drawings, in which.

In these figures, 1 represents supported single-site pre-catalyst injected into a reactor, 2 represents injected co-catalyst, 3 represents injected monomer or hydrogen gas for the preparation of preliminarily polymerized single-site catalyst, 4 represents an organic solvent containing recycled co-catalyst, 5 represents a separation process, 6 represents activated single-site catalyst, 7 represents a catalyst activation reactor, 8 represents a polymerization solvent containing recycled co-catalyst, 9 represents a separation process of separating recycled co-catalyst from the polymerization solvent and polymer, 10 represents a polymer, and 11 represents a polymerization reactor.

DETAILED DESCRIPTION OF THE INVENTION.

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

The present invention provides an olefin polymerization method with the recycling of co-catalysts comprising the following steps:

a) preparing activated single-site catalysts by contacting
   i) supported single-site pre-catalyst with
   ii) an organic solvent containing co-catalysts;
b) separating activated single-site catalysts in step a) from an organic solvent containing co-catalysts;
c) olefin polymerization using the separated single-site catalysts in step b) with one or more olefinic monomers; and
d) reusing the separated co-catalysts of step b) by recycling an organic solvent containing the separated co-catalysts and contacting them with supported single-site pre-catalysts as in a).

In addition, the present invention can provide one of the following steps optionally.

1) preparing the activated pre-polymerized single-site catalyst by polymerizing one or more olefinic monomers or olefinic monomer with or without hydrogen after or during the above step a) of preparing the activated single-site catalyst, or before or after the above step b) of separating activated single-site catalysts from co-catalysts dissolved in an organic solvent; and 2) adding one or more than one kind of co-catalyst to the above recycling step d).

Figure 1:
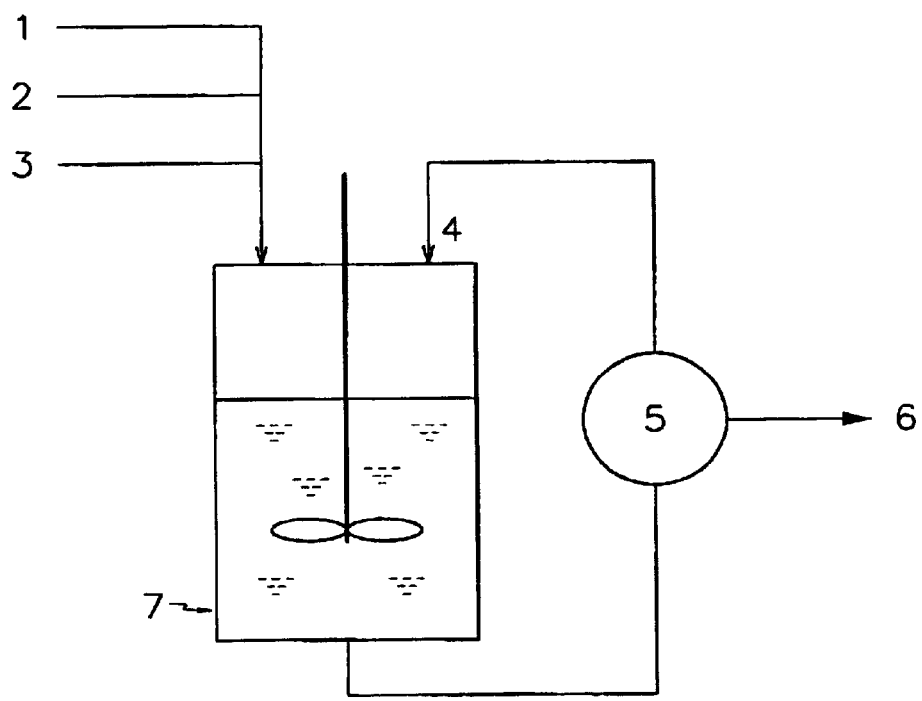
FIG. 1 is a representative drawing of a process in which this invention can be applied.
Figure 2:
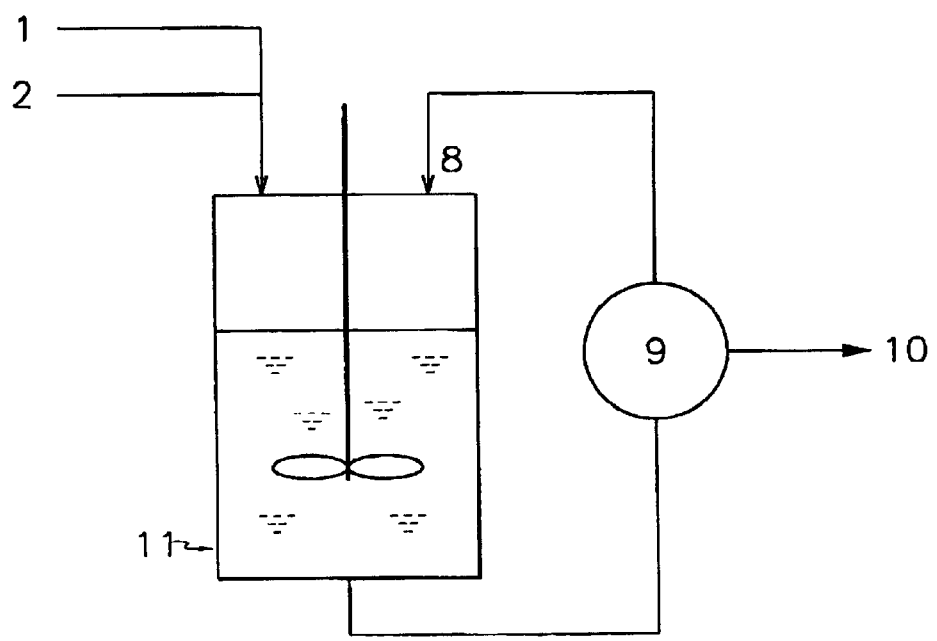
FIG. 2 is a representative drawing of the co-catalyst recycling process of the previous art.

FIG. 1 is a representative drawing of process in which the characteristics of this invention are shown. In this drawing, 1 represents supported single-site pre-catalyst injected into a reactor, 2 represents a co-catalyst, 3 represents monomer or hydrogen gas in the preparation of preliminarily polymerized single-site catalyst, 4 represents an organic solvent containing recycled co-catalyst, 5 represents a separation process, 6 represents an activated single-site catalyst, and 7 represents a catalyst activation reactor. The process of this invention is clearly distinguished from the co-catalyst recycling process of the previous art represented in FIG. 2 wherein a polymerization reactor (11) is employed in which the polymerization solvent (8) is separated from the polymer (10) and in which the solvent (8) is reused.

This invention can be described in detail as follows.

Activated catalyst is prepared by contacting the supported single-site pre-catalyst with a co-catalyst such as aluminoxane dissolved in an organic solvent, or aluminoxane and other alkyl aluminum and alkyl boron compounds. Preliminarily polymerized activated catalyst may be prepared after the catalyst activation step or in the catalyst activation step with one or more olefinic monomers or one or more olefinic monomers with or without hydrogen. Activated catalyst is separated and employed in various olefin polymerization processes especially in a slurry or a gas phase process. Organic solution containing excess co-catalyst is recycled and reused in the preparation of the activated catalyst by contacting it with single-site pre-catalysts.

Pre-requisites for the recycling of the co-catalyst including aluminoxane is that the single-site pre-catalyst can be separated from the organic solvent after an activation step and the co-catalyst component in the organic solvent must be active.

Therefore, in this invention the catalyst must be heterogenized to separate the activated single-site catalyst from the organic solvent containing excess co-catalyst.

Generally, supported single-site catalyst is prepared as follows.

Initially, the single-site pre-catalyst is physisorbed on a support and then reacted with co-catalyst such as aluminoxane.

Secondly, co-catalyst such as aluminoxane is supported on a support, which is then reacted with single-site pre-catalyst.

Thirdly, single-site pre-catalyst is reacted with co-catalyst such as aluminoxane, thereafter the activated catalyst is reacted with a support.

This invention has all three supporting methods described above, but it is more desirable to anchor transition metal compounds on a support via a chemical bond to prevent leaching of the pre-catalyst.

Supported catalysts via chemical bonding can be prepared by the methods as follows.

Initially, a ligand is anchored on a support via a chemical bond and then metal is ligated.

Secondly, single-site pre-catalyst with a functional group on a ligand is synthesized which is then anchored on a support by a reaction between the functional group on a ligand and that on a support surface. A supporting method whereby a reaction between the functional group on a ligand of a single-site pre-catalyst with silica that contains highly reactive siloxane group on a surface which is prepared by drying the silica above 600° C. is particularly desirable due to minimized side reactions.

However, in order for the present invention to achieve its objectives, the catalysts are not limited to the supported catalysts described above. Supported single-site catalysts that are separable from the organic solvent containing excess co-catalyst after an activation step are suitable for this purpose.

In this invention an activated single-site catalyst can also be prepared after a pre-polymerization step. Pre-polymerization can be performed in various processes such as a bulk, a slurry, or a gas phase process. Generally, pre-polymerization is performed by feeding one or more olefinic monomers or one or more olefinic monomers with or without hydrogen in a catalyst activation step or to an activated catalyst which is obtained by contacting single-site pre-catalyst with a co-catalyst in an organic solvent. Pre-polymerization can be performed at a temperature range of −50~100° C., or more desirably −10~80° C. The desirable weight increase after a pre-polymerization is around 0.01~100 times that of the supported catalyst.

Silica ($SiO_2$), $Al_2O_3$, $MgCl_2$, MgO, $ZrO_2$, $TiO_2$, $B_2O_3$, CaO, ZnO, $CaF_2$, $MgF_2$, zeolite or $SiO_2$—$Al_2O_3$, $SiO_2$—MgO, etc., and a mixture of each of these inorganic materials or silica mixed with small amounts of other inorganic materials can be used as supports in the present invention. Additionally organic supports such as cyclodextrine, polystyrene, polyethylene, etc., which can maintain solid shapes in the organic solvents in which single-site pre-catalysts can be activated can also be used as supports in the present invention. When using an inorganic support, the single-site pre-catalyst is chemically bonded to a functional group on the support surface. In the case of an organic support, the functional group can be introduced by a co-polymerization with a monomer containing a functional group. Or the functional group is attached to an organic support, which is then chemically reacted with a ligand on a single-site pre-catalyst to yield a supported single-site pre-catalyst.

This invention provides a method controlling the particle size of activated supported catalyst by changing the catalyst activation condition or the pre-polymerization condition. That is, the particle size of activated supported catalyst can be controlled just by changing the activation temperature or the pre-polymerization temperature or by changing the amount of the olefinic monomer or hydrogen using the same transition metal catalyst and co-catalyst. This invention, therefore, provides a useful method of controlling particle size in a slurry or a gas phase process.

The most important co-catalyst is aluminoxane, which can be expressed as the following Chemical Formula 1.

$$-[Al(R)-O]_a-$$ [Chemical Formula 1]

wherein each R, which can be the same as or different from other R, is a halogen, or a hydrocarbyl or a halogen-substituted hydrocarbyl radical having from 1 to 20 carbon atoms, and the subscript a is an integer greater than or equals to 2. This compound can exist as a linear, circular, or polymeric form. Examples of the aluminoxane are methylaluminoxane, ethylaluminoxane, isobutylaluminoxane, butylaluminoxane, etc. and suitable aluminoxane can be selected according to the catalyst activating solvent in which the solubility of the aluminoxane is optimal. That is, in an aromatic hydrocarbon solvent most of the aluminoxane can be used, but some aluminoxanes do not dissolve well in an aliphatic hydrocarbon solvent such as hexane. This is why a portion of the alkyl groups of the aluminoxane is substituted with an alkyl group containing two or more carbon atoms in case the catalyst is prepared in an aliphatic hydrocarbon solvent. The co-catalyst used in the present invention can be one or more of the above types of aluminoxane or a compound or a mixture of compounds represented by the below Chemical Formula 2 and Chemical Formula 1. Additionally, one or more of the co-catalysts can be added to a solution containing recycled co-catalyst.

$$N(R)_3$$ [Chemical Formula 2]

wherein

N is an aluminum or boron,

R, which can be the same as or different from other R, is a halogen, or a hydrocarbyl or a halogen substituted hydrocarbyl radical having from 1 to 20 carbon atoms.

Examples of alkyl metal compound described in the above chemical formula 2 include trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-s-butylaluminum, tricyclopentylaluminum, tripentylaluminum, triisopentylaluminum, trihexylaluminum, ethyidimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc. Trimethylaluminum, triethylaluminum, and triisobutylaluminum are the most preferred compounds.

Examples of organic solvents used in the present invention include aliphatic hydrocarbon solvents such as propane, isobutane, hexane, and heptane, aromatic hydrocarbon solvents such as benzene and toluene, chlorinated hydrocarbon solvents such as dichloromethane and chlorobenzene, etc. A mixture of two or more of these solvents can also be used.

Monomers such as ethylene, α-olefin, and cycloolefin can be polymerized by the method in this invention. Diene or triene olefinic monomers containing two or more double bonds can also be polymerized. Examples of the monomers include ethylene, propylene, butene, pentene, 4-methyl-1-pentene, hexene, heptene, octene, nonene, decene, undecene, dodecene, tetradecene, hexadecene, icocene, norbornene, norbornadien, ethylidenenorbornene, vinylnorbornene, dicyclopentadiene, cyclopentadiene, 1,3-butadiene, 1,4-pentadiene, 1,5-hexadiene, styrene, α-methylstyrene, divinylbenzene, 3-chloromethylstyrene, etc. Co-polymerization can be accomplished by employing more than one of these monomers.

The purpose of this invention is to provide a method for an olefin polymerization with the recycling of co-catalyst such as aluminoxane, so that the amount of the co-catalyst for the activation of catalysts can be minimized and the loss of the co-catalyst by reactions with impurities or during the polymerization process can be greatly reduced. Furthermore, inexpensive common alkyl aluminum compounds can be freely used together with aluminoxane in the olefin polymerization process and the switching to another catalytic or co-catalytic system is facile using the same process. Additionally, the reactor fouling of the olefin polymerization process can be effectively prevented by the recycling of co-catalyst during the activation step and polymers with high bulk density can be prepared. The catalyst prepared in this invention is applicable in a slurry or a gas phase process regardless of the polymerization media, and the particle size of the catalyst can be controlled by changing the catalyst activation condition or a pre-polymerization condition.

Following examples illustrate this invention in detail. However, these examples are only for illustrating the present invention, and the present invention is not limited to these examples.

EXAMPLES

Organic reagents and solvents for the catalyst synthesis and polymerization process were purchased from Aldrich or Merck and then refined by standard methods. High purity ethylene gas (Applied Gas Technology) was polymerized after passing it through a moisture and oxygen scavenging filter. Reproducibility was maintained by performing all stages of catalyst synthesis, supporting, and polymerization under inert gas atmosphere. The catalysts were analyzed by Nuclear Magnetic Resonance (NMR) spectroscopy employing either 300 MHz Bruker or 500 MHz Jeol instruments. The NMR samples were prepared in a $CDCl_3$ solution. The supported amount of catalysts was determined by measuring the Zr content using the Inductively Coupled Plasma (ICP-AES Integra XMP, GBC) spectroscopic method.

Example 1

Synthesis of $[(EtO)Me_2SiO-(CH_2)_6-C_5H_4]_2ZrCl_2$, Containing Functional Group which can Chemically Bonded to Support 1) Synthesis of Pre-catalyst $[CH_2=CH(CH_2)_4-C_5H_4]_2ZrCl_2$ To a flask containing 10.36 g of 5-hexene-1-ol, 24.11 g of p-toluenesulfonyl chloride and 200 mL of diethylether were added and well mixed. The solution was cooled down to −10° C., and 353.5 g of well ground KOH was slowly added for 10 min to the solution. The solution was stirred for 30 minutes at −15~5° C. The solution was then poured to 200 mL of ice-water. Ether solution was separated with a funnel. Then the ether solution was dried with anhydrous $MgSO_4$, filtered, and then ether was removed from the filtrate under reduced pressure. The remained product was clear and sticky. This product was dissolved in 120 mL of anhydrous THF. This solution was cooled down to 0° C. and 65 mL of 2N THF solution of NaCp was added to the cold solution. This solution was stirred for about 3~5 hours, and mixed with 200 mL of water and 200 mL of hexane in a separatory funnel. The organic layer was extracted and dried by $MgSO_4$ and filtered. Slightly yellow filtrate was vacuum dried in 0.2 torr at 55° C. to produce 9.643 g of product, pure Hexenyl-cyclopentadiene (Yield: 65%). This compound, 9.643 g, was dissolved in 100 mL of THF and cooled down to −78° C. using dry ice/aceton slush. To this solution, 26 mL of ″BuLi (2.5M, hexane) was added and the solution was stirred overnight with a slow warming to room temperature. This solution was then added to a flask containing 0.5 equivalent of $ZrCl_4(THF)_2$ at 55° C. and was agitated for 3 days. The solvent was removed under reduced pressure and 200 mL of hexane was added and heated. Filtration at 55° C. was followed by a removal of hexane and produced the white solid product (Yield: 65%). Spectroscopic analysis of the product by a NMR method is as follows:

$^1$H NMR (δ, 300 MHz, $CDCl_3$): 6.27 (t, J=2.6 Hz, 2H), 6.18 (t, J=2.6 Hz, 2 H), 5.77 (1H,ddt, 2 H, j=17.0, 10.2, 6.7 Hz), 5.1–4.8(2H, m), 2.61 (2 H t, J=7.5 Hz), 2.1–2.0 (2H, m), and 1.6–1.3 (4H,m).

$^{13}$C NMR (δ, $CDCl_3$): 138.6, 134.9,116.7, 114.5, 112.2, 33.4, 30.1, 30.0, and 28.5.

2) Synthesis of $[Cl(Me)_2Si-(CH_2)_6-C_5H_4]_2ZrCl_2$ $[CH_2=CH(CH_2)_4-C_5H_4]_2ZrCl_2$, 1.28 g, were added to a Schlenk flask in a drybox. Dried toluene, 5 mL, was slowly added to the above Schlenk flask. 20 μl of isopropanol solution(0.1M) of $H_2PtCl_6$ were added to the solution. The solvent was removed under reduced pressure and 100 mL hexane were added to the Schlenk flask to dissolve the product. The warm solution was filtered and stored in a refrigerator for 24 hours. Then a white crystalline product was obtained. (Yield 90%)

$^1$H NMR (δ,500 MHz, $CDCl_3$): 6.27 (t, J=2.4 Hz, 2H), 6.18 (t, J=2.4 Hz, 2 H), 2.06 (t, j=7.5 Hz, 2 H), 1.7–1.45 (2H, m), 1.45–1.1 (4H, m), 0.85–0.75 (2H, m), and 0.37(6H,s).

$^{13}$C NMR (δ, $CDCl_3$): 134.9, 116.6, 112.2, 32.5, 30.3, 30.0, 28.8, 22.8, 18.8, and 1.6.

3) Synthesis of $[(EtO)(Me)_2Si-(CH_2)_6-C_5H_4]_2ZrCl_2$

To 1.63 g of $[Cl(Me)_2Si-(CH_2)_6-C_5H_4]_2ZrCl_2$ prepared according to step 2) was added to triethylorthoformate 4.7 mL. To the reaction mixture, thoroughly mixed, dehydrated $AlCl_3$, 1 mL was added, then gas was evolved and reaction started. After 2 hours of reaction, gas evolution stops. After thoroughly removing the volatile material, 30 mL hexane were added to dissolve the product. Then the solution was filtered and dried under vacuum (Yield 1.60 g, 95%).

$^1$H NMR (δ,300 MHz, $CDCl_3$): 6.27 (t, J=2.4 Hz, 2H), 6.18 (t, J=2.4 Hz, 2 H), 3.62 (t, j=7.2 Hz, 2 H), 2.60 (2H, t, J=7.5 Hz), 1.7–1.2 (6H, m), 1.16 (3H, t, j=7.2 Hz), 0.65–0.45 (2H, m), and 0.06 (6H,s).

$^{13}$C NMR (δ, $CDCl_3$): 134.9, 116.6, 112.3, 58.1, 33.1, 30.2, 29.0, 23.1, 18.5, 16.3, and 0.37.

Preparation of the Dried Silica

Silica support, Grace Davison 948, 2.0 g, was dehydroxylated at 800° C. under vacuum, using an electric furnace (Lindberg Co.) for 21 hours. The amount of remained hydroxyl group population was 0.35 mmol/g.

Preparation of the Supported Catalyst

Silica support, Grace Davison 948, was transferred to the Schlenk flask and sealed in a dry box. 3.16 mL of [(EtO) $(Me)_2Si-(CH_2)_6-C_5H_4]_2ZrCl_2$ in hexane solution (concentration: 37 mg/mL) was diluted with 30 mL of hexane. This slurry was refluxed for 18 hours. The hexane was removed under reduced pressure. The resulting solid was extracted with a soxhlet apparatus in toluene for 48 hours. The Zr content of silica determined by the ICP analysis was 0.85 Zr wt %.

The Activation of Silica Supported Metallocene Catalyst 100 mg of silica supported metallocene, prepared according to the above method, was transferred to an Andrew glass reactor in a glove box, and 100 mL of purified hexane and heptane solution of MMAO-3 1.0 mL (Akzo Co. Modified Methylaluminoxane, 7.3 wt % Al, D=0.73) were added. The resulting solution was stirred for 10 min. at room temperature to activate the silica supported metallocene catalyst.

Pre-polymerization

To this slurry solution, containing silica supported metallocene catalyst, prepared according to the above method, ethylene was added at 50 mL/min., for 10 min. with agitation. After stopping the ethylene supply, the slurry solution was stirred for another 20 min. to fully consume the ethylene.

Separation of Activated Pre-polymerized Catalyst from Co-catalyst in the Solution From this slurry solution prepared from the above method, the activated pre-polymerized catalyst was settled until an organic solvent layer was clearly separated. The organic solvent layer containing co-catalyst was separated by a cannular without exposure to air.

Recycling Co-catalyst that was used for Catalyst Activation

In a dry box, 100 mg of the supported catalyst was weighed and transferred to a second glass reactor. This glass reactor was sealed, removed from the dry box and filled with hexane containing separated co-catalyst from the first activated reactor. Supported metallocene compound was activated under the same method and conditions and then pre-polymerized. The hexane layer is separated and then used in the activation of the third supported metallocene compound. In the separation of the supported metallocene compound from the hexane layer containing co-catalyst after an activation step, the hexane in the activated pre-polymerized catalyst layer could not be completely removed and there was a decrease of 10 mL of hexane in its transfer to the reactor of the next step.

Ethylene Polymerization with Activated Catalyst with Recycling Co-catalyst

The pre-polymerized catalyst prepared above was transferred to a Andrew glass reactor with 200 mL of hexane solution under an inert gas atmosphere. Polymerization was performed at 80° C. for 60 minutes under a 40 psig atmosphere of ethylene. After one hour of polymerization, the reactor was cooled down to room temperature, the polymerization was stopped by adding methanol to the reactor, and the ethylene was removed by ventilation. The obtained polymer was filtered and dried at room temperature in a vacuum oven. Table 1 shows polymerization yield and bulk density. Neither fouling nor low bulk-density polymers that would be produced by a homogeneous polymerization were observed in the reactor during polymerization. The amount of transferred hexane and polymerization results using the separated activated catalyst are showed in Table 1.

TABLE 1

| Recycled co-catalyst | 1st | 2nd | 3rd |
|---|---|---|---|
| Transferred Hexane at the catalyst activation step (mL) | 100 | 90 | 80 |
| Produced polymer | 15.2 | 13.9 | 12.4 |
| Bulk density (g/mL) | 0.35 | 0.35 | 0.35 |

In Table 1, 100 mL of hexane contains 0.054 g dissolved aluminum from aluminoxane, and polymerization was performed at 80° C. for 60 minutes under a 40 psig atmosphere of ethylene using 100 mg of silica supported metallocene catalyst.

These results clearly show that excess co-catalyst solution separated from activated catalyst can be efficiently recycled. Polymerization activity apparently decreases at each recycling step, which probably resulted from the decrease of the absolute amount of aluminoxane due to either the hexane solution in an activated catalyst layer or consumption of co-catalyst due to impurities resident in the solvent and reactor. It does not mean that the activity actually decreases during the recycling steps.

Comparative Example 1
Polymerization without Co-catalyst Recycling

MMAO-3 (Akzo Co., Modified Methylaluminoxane, 7.3 wt % Al, d=7.3), dissolved in heptane solution was respectively added in 1.0, 2.0, 2.5, 3, and 4 mL portions to five glass reactors containing 100 mg of silica supported metallocene catalyst. 200 mL of purified hexane were added to each reactor, and polymerization was performed at 80° C. for 60 minutes under a 40 psig atmosphere of ethylene. After one hour of polymerization, the reactor was cooled down to room temperature, the polymerization was stopped by adding methanol to the reactor, and the ethylene was removed by ventilation. The obtained polymer was filtered and dried at room temperature in a vacuum oven. Table 2 shows polymerization data.

TABLE 2

| Volume of alumoxane solution used | 1.0 | 2.0 | 2.5 | 3.0 | 4.0 | 1.0 (example 1) |
|---|---|---|---|---|---|---|
| Produced polymer (g) | 4.0 | 8.0 | 11.0 | 13.0 | 15.0 | 15.2 |
| Al/Zr (Mole/Mole) | 215 | 430 | 538 | 645 | 860 | 215 |

In the above Table 2, the polymerization was performed with 100 mg of supported catalyst, at a temperature of 80° C., and at an ethylene pressure of 40 psig for one hour. In the above comparative example 1, a large excess of co-catalyst was needed to obtain the highest polymerization activity. Without recycling co-catalyst, a large excess of co-catalyst is wasted in every polymerization. This shows that without recycling co-catalyst, a large excess of co-catalyst is consumed in polymerization.

Comparative Example 2

Polymerization with recycling co-catalyst which was used in the main-polymerization 100 mg of silica supported metallocene catalyst, synthesized according to Example 1, were added to 3 glass reactors and sealed in a dry box. 200 mL of purified hexane and 2 mL of MMAO-3 were added to the first reactor. After stirring in a thermobath at 80° C. for 5 hours, ethylene was added at 40 psig and polymerized for 1 hour. The reactor was cooled down to room temperature and the resulting slurry was settled down. The organic solvent layer, containing co-catalyst, was transferred by a cannular to the second flask without air contact. Polymerization was conducted by the same conditions and method as in the first reactor. In the same way, the organic solvent layer was transferred to the third reactor. Polymerization was conducted by the same condition and method as in the first reactor. In each transferring step, the volume of an organic solvent was reduced by 40 mL due to the remaining hexane in the polymer. Table 3 shows polymerization yield and transferred hexane amount.

TABLE 3

| Recycled co-catalyst | 1st | 2nd | 3rd |
|---|---|---|---|
| Transferred Hexane after polymerization (mL) | 200 | 160 | 120 |
| Produced polymer (g) | 8.6 | 7.5 | 6.4 |
| Bulk density (g/mL) | 0.29 | 0.28 | 0.27 |

The above Comparative Example 2 shows that co-catalyst recycling after the polymerization step requires an increased amount of co-catalyst for optimal activity due to the increased volume of polymerization solvent compared to the co-catalyst recycling after the catalyst activation step. That is to say, to maintain the optimal co-catalyst to catalyst ratio, the amount of co-catalyst should be increased according to the increase of solvent volume. Furthermore, the amount of impurities increases according to the increase of solvent and the loss of co-catalyst also increases. Accordingly, the required amount of co-catalyst increases more than the increased ratio of the solvent.

Therefore, in case of recycling of co-catalyst after the polymerization, the loss of co-catalyst which is included in the produced polymer is larger than the loss of co-catalyst which is included in the activated catalyst in recycling of co-catalyst in the catalyst activation step as seen in Example 1. Also, reactor fouling was observed during the polymerization and bulk density was decreased. This indicates that there was a homogeneous polymerization during the polymerization with the recycling of co-catalyst due to the side reaction in the supporting step or incomplete removal of the physisorbed transition metal compound from the silica pore.

Example 2
Single-site Pre-catalyst with a Functional Group which can Make a Chemical Bond on a Support Synthesis of $[Me_3SiO-(CH_2)_6-C_5H_4]_2ZrCl_2$ 50 mL of pyridine was added to a flask containing 9.74 g of 1,6-hexanediol and 15.7 g of p-toluenesulfonyl chloride. The solution was kept in a refrigerator for a day. The solution was then treated with 500 mL of 2 N HCl and the product was extracted with 100 mL of diethyl ether. The ether solution was dried with anhydrous $MgSO_4$, filtered, and then ether was removed from the filtrate under reduced pressure. The product, which was chromatographated on one of the hydroxyl groups, was purified by passing it through a silica gel column with diethyl ether (Yield: 9.00 g, 40%).

8.12 g of the isolated product was dissolved in 100 mL of anhydrous THF. This solution was cooled down to 0° C. and 45 mL of 2N THF solution of NaCp were added to the chilled solution. This solution was stirred for about 3 hours, and mixed with 200 mL of water and 100 mL of hexane. The organic layer was extracted and refined by passing it through a silica gel column with hexane and diethyl ether (v/v=1:1) to give 4.07 g of product, (6-hydroxy)hexylcyclopentadiene (Yield: 82%).

17.9 mmol of this compound was dissolved in 25 mL of THF, and then 2.7 mL of chlorotrimethylsilane and 3.0 mL of triethylamine were added. All volatiles were removed under a vacuum, and then it was filtered with hexane. Hexane was removed under a reduced pressure (78° C./0.2 torr) and the 3.37 g (Yield 79%) of cyclopentadiene product with a hydroxyl group protected with trimethylsilyl group was obtained.

$^1$H NMR (δ, 300 MHz, CDCl$_3$): 6.5, 5.9 (m, 3H), 3.55 (t, 2H), 2.92 (s, 1H), 2.85 (s, 1 H), 2.33 (quintet, 2H), 1.6, 1.2 (m, 8H), 0.09 (s, 9H)

11.4 mmol of this compound was dissolved in 20 mL of THF. 1.22 g of lithium diisopropylamide was transferred to the solution at −78° C. without exposure to an air. The solution was warmed up to room temperature and then stirred for 2 hours. All volatiles were removed under vacuum and the remaining organic material was extracted with mixture of toluene and hexane. To this liquid, 2.0 mL of chlorotrimethylsilane was added and left in a refrigerator for an hour to give a white solid product (Yield 70%).

$^1$H NMR (δ, 300 MHz, CDCl$_3$): 6.34 (s, 2H), 6.25 (s, 2H), 3.62 (t, 2H), 2.68 (t, 2H), 1.6, 1.2 (m, 8H) 0.17 (s, 9H).

Preparation of single-site pre-catalyst supported on silica via a chemical bond

Silica support was dried according to the Example 1. The dried silica was transferred to a Schlenk flask, sealed, and removed from a dry box. 10 mL of toluene were added to this flask and 10 mL of toluene solution containing 0.2 mmol of metallocene compound prepared as above were also transferred to the flask. The solution was allowed to stand for 18 hours at 70° C. Toluene was then removed under reduced pressure. The resulting solid was extracted with a soxhlet apparatus in toluene for 1 week to remove physisorbed compounds. The amount of supported metallocene compound was determined by ICP analysis to be 0.90 Zr wt %.

Activation of Single-site Pre-catalyst

The supported metallocene complex was activated using the same method as Example 1.

Pre-polymerization

Pre-polymerization was carried out using the same method as Example 1.

Separation of Co-catalyst from Activated and Pre-polymerized Catalyst

The co-catalyst was separated using the same method as Example 1.

Recycling of Co-catalyst used for Activating Supported Pre-catalyst

Separated co-catalyst using the same method as Example 1 was used again to activate metallocene complex.

Ethylene Polymerization using Separated Activated Catalyst

Polymerization was carried out using the same method as Example 1. Neither fouling nor low bulk-density polymers that would be produced by a homogeneous polymerization were observed in the reactor during polymerization. The amount of transferred hexane and polymerization results are showed in Table 4.

TABLE 4

| Co-catalyst recycling | 1st | 2nd | 3rd |
| --- | --- | --- | --- |
| Transferred hexane At the activation step (mL) | 100 | 90 | 80 |
| Produced polymer (g) | 13.8 | 12.8 | 9.2 |
| Bulk density (g/mL) | 0.35 | 0.35 | 0.35 |

In Table 4, 0.054 g of aluminum from alumninoxane is dissolved in 100 mL of hexane, and polymerization was performed at 80° C. for 1 hour under a 40 psig atmosphere of ethylene using 100 mg of supported catalyst.

These results clearly show that excess co-catalyst solution separated from activated catalyst can be efficiently recycled. Polymerization activity apparently decreases at each recycling step, which probably results from the decrease of the absolute amount of aluminoxane due to either the hexane solution in an activated catalyst layer or consumption of co-catalyst due to impurities resided in the solvent and reactor. It does not mean that the activity actually decreases during the recycling steps.

Comparative Example 3

Polymerization with recycling co-catalyst which was used in the main-polymerization With supported metallocene complex that is produced according to Example 2, polymerization was carried out using the same method as comparative example 2. The results are shown in Table 5.

TABLE 5

| Co-catalyst recycling | 1st | 2nd | 3rd |
| --- | --- | --- | --- |
| Transferred hexane At the activation step (mL) | 200 | 160 | 120 |
| Produced polymer (g) | 7.4 | 6.5 | 5.4 |
| Bulk density (g/mL) | 0.29 | 0.28 | 0.27 |

The above Comparative Example 4 shows that co-catalyst recycling in the polymerization step requires an increased amount of co-catalyst for optimal activity due to the increased volume of polymerization solvent compared to the co-catalyst recycling after the catalyst activation step. That is to say, to maintain the optimal co-catalyst to catalyst ratio, the amount of co-catalyst should be increased according to the increase of solvent volume. Furthermore, the amount of impurities increases according to the increase of solvent and the loss of co-catalyst also increases. Therefore, the required amount of co-catalyst increases more than the increased ratio of the solvent.

Therefore, in case of recycling of co-catalyst after the polymerization, the loss of co-catalyst which is included in the produced polymer is larger than the loss of co-catalyst which is included in the activated catalyst in recycling of co-catalyst in the catalyst activation step as seen in Example 2. Also, reactor fouling was observed during the polymerization and bulk density was decreased. This indicate that there was a homogeneous polymerization during the polymerization with recycling co-catalyst due to the side reactions in the supporting step or incomplete removal of the physisorbed transition metal compounds from the silica pores.

Example 3

Single-site Pre-catalyst with a Functional Group that can Make a Chemical Bond on a Support Synthesis of [HMe$_2$SiO—(CH$_2$)$_6$—C$_5$H$_4$]$_2$ZrCl$_2$ To an ice cooled 278 mL of 2N THF solution of NaCp, 30 g of 6-chlorohexanol was added slowly. The reaction solution was warmed up to room temperature slowly and stirred overnight. The solution was then mixed with 200 mL of distilled water and extracted with 100 mL of diethyl ether. The extracted organic layer was dried with anhydrous MgSO$_4$. MgSO$_4$ was separated by a filtration and the diethyl ether was removed from the filtrate under reduced pressure. The product, (6-hydroxy)hexylcyclopentadiene, was distilled at 100° C. at 0.2 mbar to give 17.7 g (Yield: 49%).

To a 100 mL THF solution containing the 17.56 g of this product at −30° C., 85 mL of n-BuLi (2 equiv) was added slowly. The solution was then warmed to room temperature slowly and stirred another 2 hours. To this solution 0.5 equivalent of $ZrCl_4 \cdot 2THF$ was added and stirred overnight at 50° C. On the next day, 1.5 equivalents of chlorodimethylsilane was added to the solution, which was then stirred for 3 hours at room temperature. All volatiles were removed under vacuum and the product was extracted with hexane (Yield: 52%).

Spectroscopic analysis results by the NMR method are as follows:

$^1H$ NMR ($\delta$, 500 MHz, $CDCl_3$): 6.27 (t, 2 H), 6.18 (t, 2 H), 4.59 (t, 1 H), 2.60 (t, 2 H), 2.61 (t, 2H), 1.5, 1.3 (m, 8 H), 0.19 (s, 6 H).

Preparation of single-site pre-catalyst supported on silica via a chemical bond

Silica support, Grace Davison (XPO 2412), was dried at 800° C. under vacuum for 15 hours. To 40 mL of hexane solution containing 100 mg of the catalyst made above, 1 g of the dried silica was added. The solution was left for 4 hours at 85° C. Hexane was decanted from the solution and the supported catalyst was dried under vacuum. 0.93 wt % of Zr content on the silica was determined by the Inductively Coupled Plasma (ICP) analysis.

Activation of Single-site Pre-catalyst

The supported metallocene complex is activated using the same method as Example 1.

Pre-polymerization

Pre-polymerization is carried out using the same method as Example 1.

Separation of Co-catalyst from Activated and Pre-polymerized Catalyst

The co-catalyst is separated using the same method as Example 1.

Recycling of Co-catalyst used for Activating Supported Pre-catalyst

Separated co-catalyst using the same method as Example 1 is used again to activate metallocene complex.

Ethylene Polymerization using Separated Activated Catalyst

Polymerization is carried out using the same method as Example 1. Neither fouling nor low bulk-density polymers that would be produced by a homogeneous polymerization were observed in the reactor during polymerization. The amount of transferred hexane and polymerization results are showed in Table 6.

TABLE 6

| Co-catalyst recycling | 1st | 2nd | 3rd |
| --- | --- | --- | --- |
| Transferred hexane At the activation step (mL) | 100 | 90 | 80 |
| Produced polymer (g) | 14.0 | 12.6 | 11.1 |
| Bulk density (g/mL) | 0.35 | 0.35 | 0.35 |

In Table 6, 0.054 g of aluminum from alumninoxane was dissolved in 100 mL of hexane, and polymerization was performed at 80° C. for 1 hour under 40 psig atmosphere of ethylene using 100 mg of supported catalyst.

These results clearly show that excess co-catalyst solution separated from activated catalyst can be efficiently recycled. Polymerization activity apparently decreases at each recycling step, which probably results from the decrease of the absolute amount of aluminoxane due to either the hexane solution in an activated catalyst layer or consumption of co-catalyst due to impurities resided in the solvent and reactor. It does not mean that the activity actually decreases during the recycling steps.

Comparative Example 4
Polymerization with Recycling Co-catalyst which was used in the Main-polymerization With supported metallocene complex that is produced according to Example 3, polymerization was carried out using the same method as comparative example 2. The results are shown in Table 7.

TABLE 7

| Co-catalyst recycling | 1st | 2nd | 3rd |
| --- | --- | --- | --- |
| Transferred hexane After polymerization (mL) | 200 | 160 | 120 |
| Produced polymer (g) | 7.8 | 6.9 | 6.0 |

The above Comparative Example 4 shows that co-catalyst recycling after the polymerization step requires increased amount of co-catalyst for optimal activity due to the increased volume of polymerization solvent compared to the co-catalyst recycling after the catalyst activation step. That is to say, to maintain the optimal co-catalyst to catalyst ratio, the amount of co-catalyst should be increased according to the increase of solvent volume. Furthermore, the amount of impurities increases according to the increase of solvent and the loss of co-catalyst also increases. Accordingly, the required amount of co-catalyst increases more than the increased ratio of the solvent.

Therefore, in case of recycling of co-catalyst after the polymerization, the loss of co-catalyst which is included in the produced polymer is larger than the loss of co-catalyst which is included in the activated catalyst in recycling of co-catalyst in the catalyst activation step as seen in Example 3.

Example 4

Synthesis of single-site pre-catalyst [t-butyl-O—$(CH_2)_6$—$C_5H_4]_2ZrCl_2$ with a functional group which can make a chemical bond with a support Tertiary-butyl-O—$(CH_2)_6$—Cl was prepared from 6-cholrohexanol by the literature method (Tetrahedron Lett. 2951, (1988)). To this, 1 equivalent of NaCp (2.0 M in THF) was added and stirred overnight. Water was added to this solution and the organic layer was extracted and dried with anhydrous $MgSO_4$. The solvent was removed and t-Butyl-O—$(CH_2)_6$—$C_5H_5$ was obtained by vacuum distillation (Yield: 60%, b.p. around 80° C. at 0.1 mmHg).

1.349 g of this compound, was dissolved in 5 mL of THF and cooled down to −40° C. To this solution, 1 equivalent of $^nBuLi$ (in hexane) was added and the solution was stirred for 3 hours with a slow warming to room temperature. This solution was then added to a flask containing 0.5 equivalent of $ZrCl_4 \cdot 2THF$ at 55° C. and was agitated for 40 hours. The solvent was removed by distillation and 30 mL of hexane was added. Filtration at 55° C. was followed by a removal of hexane and gave 1.711 g of the product (Yield: 92%). This product was used for the preparation of supported catalyst without a further purification step.

Spectroscopic analysis by the NMR method is as follows:

$^1H$ NMR ($\delta$, 300 MHz, $CDCl_3$): 6.28 (t, J=2.6 Hz, 2 H), 6.19 (t, J=2.6 Hz, 2 H), 3.31 (t, J=6.6 Hz, 2 H), 2.62 (t, J=8 Hz), 1.7–1.3 (m, 8 H), and 1.17 (s, 9 H);

$^{13}C$ NMR ($\delta$, $CDCl_3$): 135.09, 116.66, 112.28, 72.42, 61.52, 30.66, 30.61, 30.14, 29.18, 27.58, and 26.00.

Preparation of Single-site Pre-catalyst Supported on Silica by a Chemical Bond

Silica support, Grace Davison (XPO 2412), was dried at 800° C. under vacuum for 15 hours. To 10 mL of hexane solution containing 100 mg of the catalyst made above, 1 g of the dried silica in 20 mL of hexane was added. The solution was stirred for 4 hours at 85° C. Hexane was decanted from the solution and the supported catalyst was dried under vacuum.

Activation of Single-site Pre-catalyst

The supported metallocene complex was activated using the same method as Example 1.

Pre-polymerization

Pre-polymerization was carried out using the same method as Example 1.

Separation of Co-catalyst from Activated Pre-polymerization Catalyst Solution

The co-catalyst was separated using the same method as Example 1.

Recycling of Co-catalyst used to Activate Supported Pre-catalyst

Separated co-catalyst using the same method as Example 1 was used again to activate metallocene complex.

Ethylene Polymerization using Separated, Activated Catalyst

Polymerization is carried out using the same method as Example 1. Neither fouling nor low bulk-density polymers that would be produced by a homogeneous polymerization were observed in the reactor during polymerization. The amount of transferred hexane and polymerization results are showed in Table 8.

TABLE 8

| Co-catalyst recycling | 1st | 2nd | 3rd |
|---|---|---|---|
| Transferred hexane At the activation step (mL) | 100 | 90 | 80 |
| Produced polymer (g) | 14.5 | 13.2 | 11.6 |
| Bulk density (g/mL) | 0.35 | 0.35 | 0.35 |

In Table 8, 0.054 g of aluminum from alumninoxane were dissolved in 100 mL of hexane, and polymerization was performed at 80° C. for 1 hour under a 40 psig atmosphere of ethylene using 100 mg of supported catalyst.

These results clearly show that excess co-catalyst solution separated from activated catalyst can be efficiently recycled. Polymerization activity apparently decreases at each recycling step, which probably results from the decrease of the absolute amount of aluminoxane due to either the hexane solution in an activated catalyst layer or consumption of co-catalyst due to impurities resided in the solvent and reactor. It does not mean that the activity actually decreases during the recycling steps.

Comparative Example 5

Polymerization with Recycling Co-catalyst which was used in the Main-polymerization With supported metallocene complex that was produced in Example 4, polymerization was carried out using the same method as Comparative Example 2. The results are shown in Table 9.

TABLE 9

| Co-catalyst recycling | 1st | 2nd | 3rd |
|---|---|---|---|
| Transferred hexane After polymerization (mL) | 200 | 160 | 120 |
| Produced polymer (g) | 8.0 | 7.2 | 6.8 |

The above Comparative Example 5 shows that co-catalyst recycling after the polymerization step requires increased amount of co-catalyst for optimal activity due to the increased volume of polymerization solvent compared to the co-catalyst recycling after the catalyst activation step. That is to say, to maintain the optimal co-catalyst to catalyst the amount of co-catalyst should be increased according to the increase of solvent volume. Furthermore, the amount of impurities increases according to the increase of solvent and the loss of co-catalyst also increases. Accordingly, the required amount of co-catalyst increases more than the increased ratio of the solvent.

Therefore, in case of recycling of co-catalyst after the polymerization, the loss of co-catalyst which is included in the produced polymer is larger than the loss of co-catalyst which is included in the activated catalyst in recycling of co-catalyst in the catalyst activation step as seen in Example 4.

Example 5

The catalyst prepared according to Example 4 was used. In order to activate the metallocene complex, 10 mL of aluminoxane solution dissolved in hexane (1.0 mL of MMAO solution and 100 mL of hexane) were added from the second recycling step so as to compensate for the amount of alumoxane lost into the activated catalyst. Neither fouling nor low bulk-density polymers that would be produced by homogeneous polymerization were observed in the reactor during polymerization. Polymerization results are shown in Table 10.

TABLE 10

| Co-catalyst recycling | 1st | 2nd | 3rd |
|---|---|---|---|
| Transferred hexane At the activation step (mL) | 100 | 100 | 100 |
| Produced polymer (g) | 14.5 | 14.3 | 14.4 |
| Bulk density (g/mL) | 0.35 | 0.35 | 0.35 |

In Table 10, the aluminum amount of 0.054 g within aluminoxane was dissolved in a 100 mL hexane, and 10 volume % of the aluminoxane stock solution was added in the each step except for the first. Polymerization was performed at 80° C. for 1 hour under a 40 psig atmosphere of ethylene using 100 mg of supported catalyst.

The results indicate that excess aluminoxane will activate metallocene compound but the amount of actually consumed MAO to keep the activity level was 10% or so.

Example 6

Metallocene compound prepared according to Example 4 was used for a polymerization. In each polymerization step 0.2 mmol of triisobutylaluminum was added prior to an addition of aluminoxane solution and the volume of hexane was set to 100 mL. During the polymerization reactions, polymers sticking to a reactor wall or polymers with low bulk density due to homogeneous polymerization were not observed. The polymerization result is shown in Table 11.

TABLE 11

| Co-catalyst recycling | 1st | 2nd | 3rd |
|---|---|---|---|
| Transferred hexane At the activation step (mL) | 100 | 100 | 100 |
| Produced polymer (g) | 14.9 | 14.8 | 14.4 |
| Bulk density (g/mL) | 0.35 | 0.35 | 0.35 |

In the above Table 11, 0.054 g of aluminum from alumninoxane was dissolved in 100 mL of hexane. The polymerization is performed with 100 mg of supported catalyst, at the temperature of 80° C., and at the ethylene pressure of 40 psig for one hour.

Triisobutylaluminum was added in the polymerization and the activity was superior to that of Example 4. The low-cost alkylaluminum was partly functioning the role of aluminoxane and also a scavenger role. This result shows that the expensive aluminoxane can be substituted with the low-cost alkylaluminum.

Comparative Example 6
Recycling of Co-catalyst used in the Polymerization

Metallocene compound was prepared according to Example 4, and polymerization was performed according to the comparative example 2, except that 0.4 mmol of triisobutylaluminum was added in each polymerization step, and the amount of polymerization solvent was set to 200 mL so that the concentration of triisobutylaluminum was same with that of Example 6. The result is shown in Table 12.

TABLE 12

| Co-catalyst recycling | 1st | 2nd | 3rd |
| --- | --- | --- | --- |
| Transferred hexane After polymerization (mL) | 200 | 200 | 200 |
| Produced polymer (g) | 5.7 | 4.3 | 3.0 |

In the above Table 15, the polymerization was performed with 100 mg of supported catalyst, at the temperature of 80° C., and at the ethylene pressure of 40 psig for one hour.

In the above comparative example 6, the polymerization activity was lower than that of the Example 6. In the Example 6, added triisobutylaluminum can substitute for the role of aluminoxane as a scavenger of impurities. However, in the recycling of co-catalyst after the polymerization, not only the added triisobutylaluminum but also the recycled aluminoxane react with impurities simultaneously. Therefore, it is difficult to replace high-cost aluminoxane with low-cost alkylaluminum, and the unreacted excess triisobutyllaluminum reduces the polymerization activity of catalyst.

Example 7

Metallocene compound prepared according to Example 4 was activated according to Example 1. In each polymerization step 0.2 mmol of trimethylaluminum was added prior to an addition of aluminoxane solution and the volume of hexane was set to 100 mL. During the polymerization reactions, polymers sticking to a reactor wall or polymers with low bulk density due to homogeneous polymerization were not observed. The polymerization result is shown in Table 13.

TABLE 13

| Co-catalyst recycling | 1st | 2nd | 3rd |
| --- | --- | --- | --- |
| Transferred hexane At the activation step (mL) | 100 | 100 | 100 |
| Produced polymer (g) | 15.0 | 14.7 | 14.5 |
| Bulk density (g/mL) | 0.35 | 0.35 | 0.35 |

In the above Table 13, 0.054 g of aluminum from alumninoxane is dissolved in 100 mL of hexane. 10% of aluminoxane was added from the $2^{nd}$ recycling and the polymerization was performed with 100 mg of supported catalyst, at the temperature of 80° C., and at the ethylene pressure of 40 psig for one hour.

Trimethylaluminum was added in the polymerization and the activity was superior to that of Example 4. The low-cost alkylaluminum was partly functioning the role of aluminoxane and also the scavenger role. This result shows that the expensive aluminoxane can be substituted with the low-cost alkylaluminum.

Example 8

Metallocene compound prepared according to Example 4 was activated according to Example 1. In each polymerization step 0.2 mmol of triethylaluminum was added prior to an addition of aluminoxane solution and the volume of hexane was set to 100 mL. During the polymerization reactions, polymers sticking to a reactor wall or polymers with low bulk density due to homogeneous polymerization were not observed. The polymerization result is shown in Table 14.

TABLE 14

| Co-catalyst recycling | 1st | 2nd | 3rd |
| --- | --- | --- | --- |
| Transferred hexane At the activation step (mL) | 100 | 90 | 80 |
| Produced polymer (g) | 14.5 | 14.3 | 14.2 |
| Bulk density (g/mL) | 0.35 | 0.35 | 0.35 |

In the above Table 14, 0.054 g of aluminum from alumninoxane was dissolved in 100 mL of hexane. 10% of aluminoxane was added from the $2^{nd}$ recycling and the polymerization was performed with 100 mg of supported catalyst, at the temperature of 80° C., and at the ethylene pressure of 40 psig for one hour.

Triethylaluminum was added in the polymerization and the activity was similar to that of Example 4. The low-cost alkylaluminum was partly functioning the role of aluminoxane and also the scavenger role. This result shows that the expensive aluminoxane can be substituted with the low-cost alkylaluminum.

Comparative Example 4

Experiment with recycled co-catalyst in the polymerization

Metallocene compound was prepared according to Example 4, and polymerization was performed according to the comparative example 2, except that 0.4 mmol of triethylaluminum were added in each polymerization step, and the amount of polymerization solvent was set to 200 mL so that the concentration of triethylaluminum was same with that of Example 8. The result is shown in Table 15.

TABLE 15

| Co-catalyst recycling | 1st | 2nd | 3rd |
| --- | --- | --- | --- |
| Transferred hexane After polymerization (mL) | 200 | 160 | 120 |
| Produced polymer (g) | 4.7 | 3.3 | 2.7 |

In the above Table 15, the polymerization was performed with 100 mg of supported catalyst, at the temperature of 80° C., and at the ethylene pressure of 40 psig for one hour.

In the above comparative example 7, the polymerization activity was lower than that of the Example 8. In the Example 8, added triethylaluminum can substitute the role of aluminoxane as a scavenger for impurities. However, in the recycling of co-catalyst after the polymerization, not only the added triisobutylaluminum but also the recycled aluminoxane reacts with impurities simultaneously. Therefore, it is difficult to replace high-cost aluminoxane with low-cost alkylaluminum, and the unreacted excess triethylaluminum reduces the polymerization activity of catalyst.

Example 9

Metallocene compound prepared according to Example 4 was activated according to Example 1 and was then used for a polymerization. The silica samples used in this example are Grace Silica XPO-2412 and XPO-2402. Ethylene feeding time was varied from 5 min., 10 min., 20 min., to 30 min. Particle size of the activated catalyst and polymer sample were analyzed by a Particle Size Analyser (Mastersizer prepared by Malvern). The result is shown in Table 16.

TABLE 16

| Support | Particle Size of Support ($\mu$m, 50th%) | Preliminary polymerization time (min.) | Particle Size of activated catalyst ($\mu$m, 50th%) | Particle Size of polymer ($\mu$m, 50th%) |
|---|---|---|---|---|
| XPO-2402 | 53 | 5 | 62 | 401 |
| XPO-2402 | 53 | 10 | 87 | 444 |
| XPO-2402 | 53 | 20 | 95 | 450 |
| XPO-2402 | 53 | 30 | 100 | 480 |
| XPO-2412 | 20 | 5 | 35 | 204 |
| XPO-2412 | 20 | 10 | 52 | 231 |
| XPO-2412 | 20 | 20 | 63 | 235 |
| XPO-2412 | 20 | 30 | 90 | 240 |

The result of the above Table 16 shows that the particle size of the activated catalyst can be easily controlled by changing the preliminary polymerization conditions (preliminary polymerization period) in the preparation of a catalyst.

Example 10

Metallocene compound prepared according to Example 4 was activated according to Example 1 and was then used for a polymerization. The particle size of the activated catalyst and polymer obtained after 10 minutes feeding of ethylene and hydrogen by a Mass Flow Controller (MFC) in the preliminary polymerization were analyzed by a Particle Size Analyser (Mastersizer prepared by Malvern). The result is shown in Table 17.

TABLE 17

| Support | Particle Size of support ($\mu$m, 50th%) | Volume of ethylene % | Volume of Hydrogen % | Particle Size of activated catalyst ($\mu$m, 50th%) |
|---|---|---|---|---|
| XPO-2412 | 20 | 95 | 5 | 41 |
| XPO-2412 | 20 | 92 | 8 | 35 |
| XPO-2412 | 20 | 90 | 10 | 30 |

The result of the above Table 17 shows that the particle size of the activated catalyst can be easily controlled by changing the preliminary polymerization condition (the ratio of ethylene to hydrogen) in the preparation of a catalyst.

What is claimed is:

1. An olefin polymerization process with recycling of co-catalyst which comprises steps of:
    a) preparing activated single-site catalysts by contacting
        i) supported single-site pre-catalyst with
        ii) an organic solvent containing co-catalysts;
    b) separating activated single-site catalysts in a) from an organic solvent containing co-catalysts;
    c) olefin polymerization using the separated single-site catalysts in b) with one or more olefinic monomers; and
    d) reusing the separated co-catalysts in b) by recycling the organic solvent containing the separated co-catalysts and contacting them with supported single-site pre-catalysts as in a).

2. The olefin polymerization process with recycling of co-catalyst in accordance with claim 1, which comprises steps of:
    a) preparing activated single-site catalysts by contacting
        i) supported single-site pre-catalyst with
        ii) an organic solvent containing co-catalysts;
    b) preparing activated pre-polymerized single-site catalysts by adding one or more olefinic monomers, or one or more olefinic monomers and hydrogen into the solution of activated single-site catalysts in a);
    c) separating activated pre-polymerized single-site catalysts in b) from the organic solvent containing co-catalysts;
    d) olefin polymerization using the separated pre-polymerized single-site catalysts in c) with one or more olefinic monomers; and
    e) reusing the separated co-catalysts in c) by recycling the organic solvent containing the separated co-catalyst and contacting them with supported single-site pre-catalysts as in a).

3. The olefin polymerization process with recycling of co-catalyst in accordance with claim 2, in which the pre-polymerization is performed after or at the time of preparing an activated single-site catalyst.

4. The olefin polymerization process with recycling of co-catalyst in accordance with claim 1, which comprises steps of:
    a) preparing activated single-site catalysts by contacting
        i) supported single-site pre-catalyst with
        ii) an organic solvent containing co-catalysts;
    b) separating the activated single-site catalysts in a) from an organic solvent containing co-catalysts;
    c) preparing activated pre-polymerized single-site catalysts by adding one or more olefinic monomers, or one or more olefinic monomers and hydrogen into the solution of activated single-site catalysts in b);
    d) olefin polymerization using the pre-polymerized single-site catalysts in c) with one or more olefinic monomers; and
    e) reusing the separated co-catalysts in b) by recycling the organic solvent containing the separated co-catalyst and contacting them with supported single-site pre-catalysts as in a).

5. The olefin polymerization process with recycling of co-catalyst in accordance with claim 1, wherein the supported single-site pre-catalyst in the step i) of a) is anchored on a support by a chemical bond between the functional group of a support and that of a ligand of a single-site pre-catalyst.

6. The olefin polymerization process with recycling of co-catalyst in accordance with claim 1, wherein the support is silica.

7. The olefin polymerization process with recycling of co-catalyst in accordance with claim 1, wherein one or more co-catalysts of the step ii) of a) are selected from a group of compounds represented by the Chemical Formula 1 or a group of compounds represented by the Chemical Formula 2, $-[Al(R)-O]_a-$     [Chemical Formula 1]

wherein each R, which can be the same as or different from other R, is a halogen, or a hydrocarbyl or a halogen-substituted hydrocarbyl radical having from 1 to 20 carbon atoms, and the subscript a is an integer greater than or equals to 2;

$N(R)_3$     [Chemical Formula 2]

wherein N is an aluminum or boron, R, which can be the same as or different from other R, is a halogen, or a hydrocarbyl or a halogen-substituted hydrocarbyl radical having from 1 to 20 carbon atoms.

8. The olefin polymerization process with recycling of co-catalyst in accordance with claim 7, wherein the hydrocarbyl radical of the above Chemical Formula 2 is methyl, ethyl, or isobutyl radical.

9. The olefin polymerization process with recycling of co-catalyst in accordance with claim 1, wherein the organic solvent of the above step ii) of a) is hexane or isobutane, and the co-catalyst is methylaluminoxane in which a portion of the methyl groups are substituted with alkyl groups containing two or more carbon atoms.

10. The olefin polymerization process with recycling of co-catalyst in accordance with claim 1, wherein the polymerization process in step c) is a slurry or a gas phase process.

11. The olefin polymerization process with recycling of co-catalyst in accordance with claim 1, wherein the recycling of the separated co-catalyst in step d) is performed by adding one or more co-catalysts to the separated co-catalyst and then contacting them with supported single-site pre-catalyst.

12. The olefin polymerization process with recycling of co-catalyst in accordance with claim 11, wherein the added co-catalysts are selected from a group of compounds represented by the Chemical Formula 1 or a group of compounds represented by the Chemical Formula 2 shown below, $-[Al(R)-O]_a-$     [Chemical Formula 1]

wherein each R, which can be the same as or different from other R, is a halogen, or a hydrocarbyl or a halogen-substituted hydrocarbyl radical having from 1 to 20 carbon atoms, and the subscript a is an integer greater than or equals to 2;

$N(R)_3$     [Chemical Formula 2]

wherein N is an aluminum or boron, R, which can be the same as or different from other R, is a halogen, or a hydrocarbyl or a halogen-substituted hydrocarbyl radical having from 1 to 20 carbon atoms.

13. The olefin polymerization process with recycling of co-catalyst in accordance with claim 12, wherein the hydrocarbyl radical of the above Chemical Formula 2 is methyl, ethyl, or isobutyl radical.

\* \* \* \* \*